US010549587B2

(12) United States Patent
Kollmitzer et al.

(10) Patent No.: US 10,549,587 B2
(45) Date of Patent: Feb. 4, 2020

(54) METHOD, COMPONENT, TIRE-MOUNTED TPMS MODULE, TPMS SYSTEM, AND MACHINE READABLE STORAGE OR COMPUTER PROGRAM FOR DETERMINING TIME INFORMATION OF AT LEAST ONE CONTACT PATCH EVENT OF A ROLLING TIRE, METHOD FOR LOCATING A TIRE

(71) Applicant: Infineon Technologies AG, Neubiberg (DE)

(72) Inventors: Benjamin Kollmitzer, Graz (AT); Christoph Steiner, St. Margarethen (AT)

(73) Assignee: Infineon Technologies AG, Neubiberg (DE)

(*) Notice: Subject to any disclaimer, the term of this patent is extended or adjusted under 35 U.S.C. 154(b) by 137 days.

(21) Appl. No.: 15/788,030

(22) Filed: Oct. 19, 2017

(65) Prior Publication Data
US 2019/0118591 A1   Apr. 25, 2019

(51) Int. Cl.
*B60C 23/06*   (2006.01)

(52) U.S. Cl.
CPC .......... *B60C 23/061* (2013.01); *B60C 23/064* (2013.01); *B60Y 2400/304* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06;
(Continued)

(56) References Cited

U.S. PATENT DOCUMENTS 5,749,984 A * 5/1998 Frey ...................... B60C 23/064
152/152.1
6,538,566 B1   3/2003 Morand
(Continued)

FOREIGN PATENT DOCUMENTS

WO      2012085655 A2    6/2012

OTHER PUBLICATIONS

Final Office Action dated Jan. 18, 2019 in connection with U.S. Appl. No. 15/788,088.
(Continued)

*Primary Examiner* — Andre J Allen
(74) *Attorney, Agent, or Firm* — Eschweiler & Potashnik, LLC

(57) ABSTRACT

Examples provide a method, a component, a tire-mounted TPMS module, a TPMS system and a machine readable storage or computer program for determining time information of at least one contact patch event of a rolling tire and a method for locating a tire. A method for determining time information of at least one contact patch event of a rolling tire, includes obtaining information indicative of a rotational rate of the tire; obtaining a sequence of samples indicative of at least an acceleration component during at least one rotation of the tire; and determining a position of at least one reference sample in the sequence, wherein the position of the at least one reference sample is indicative of the time information of the contact patch event of the rolling tire.

20 Claims, 9 Drawing Sheets

(58) Field of Classification Search
CPC ........ G01M 17/08; G01M 1/02; G01M 1/045;
G01M 1/12; G01M 1/225; G01M 3/40;
G01M 5/0091; G01M 7/02; G01M 99/00;
G01M 99/002; B60C 23/0494; B60C
23/0493; B60C 23/04; B60C 2019/004;
B60C 19/00; B60C 23/0498; B60C
23/0411; B60C 23/0496; B60C 23/064;
B60C 23/0408; B60C 23/041; B60C
23/0488; B60C 23/20; B60C 11/243;
B60C 23/06; B60C 11/246; B60C 23/00;
B60C 23/0486; B60C 23/061; B60C
11/0083; B60C 13/003; B60C 2009/2038;
B60C 23/003; B60C 23/004; B60C 23/02;
B60C 23/0401; B60C 23/0416; B60C
23/0433; B60C 23/0447; B60C 23/0455;
B60C 23/0489; B60C 23/0491; B60C
23/066; B60C 25/002; B60C 25/005;
B60C 25/007; B60C 29/02; B60C 3/04;
B60C 99/00; B60C 99/006; B60C 11/24;
B60C 13/001; B60C 13/02; B60C
15/0036; B60C 17/02; B60C 2009/0071;
B60C 2009/2022; B60C 2200/02; B60C
2200/06; B60C 2200/065; B60C 23/001;
B60C 23/007; B60C 23/008; B60C
23/0406; B60C 23/0413; B60C 23/0427;
B60C 23/0454; B60C 23/0459; B60C
23/0462; B60C 23/0467; B60C 23/0471;
B60C 23/0472; B60C 23/0474; B60C
23/0476; B60C 23/065; B60C 23/10;
B60C 25/0548; B60C 25/056; B60C
25/132; B60C 25/138; B60C 25/18; B60C
29/005; B60C 9/005; B60C 9/18; B60C
9/1807; B60C 9/20; B60C 9/28
USPC .................................. 73/146–146.8
See application file for complete search history.

(56) References Cited

U.S. PATENT DOCUMENTS

| | | | |
|---|---|---|---|
| 2003/0006890 A1* | 1/2003 | Magiawala | B60C 23/0408 340/438 |
| 2005/0192727 A1 | 9/2005 | Shostak | |
| 2005/0273218 A1 | 12/2005 | Breed | |
| 2006/0025897 A1 | 2/2006 | Shostak | |
| 2006/0180371 A1 | 8/2006 | Breed | |
| 2006/0212194 A1 | 9/2006 | Breed | |
| 2006/0243043 A1 | 11/2006 | Breed | |
| 2006/0244581 A1 | 11/2006 | Breed | |
| 2006/0284839 A1 | 12/2006 | Breed | |
| 2007/0005202 A1 | 1/2007 | Breed | |
| 2007/0057781 A1 | 3/2007 | Breed | |
| 2007/0096565 A1 | 5/2007 | Breed | |
| 2007/0107506 A1 | 5/2007 | Kishida | |
| 2007/0126561 A1 | 6/2007 | Breed | |
| 2007/0156312 A1 | 7/2007 | Breed | |
| 2007/0156320 A1 | 7/2007 | Breed | |
| 2007/0164853 A1 | 7/2007 | Matsuda | |
| 2007/0171034 A1 | 7/2007 | Mancosu | |
| 2007/0205879 A1 | 9/2007 | Matsuda | |
| 2007/0205881 A1 | 9/2007 | Breed | |
| 2007/0213953 A1 | 9/2007 | Kitazaki | |
| 2007/0240501 A1 | 10/2007 | Mancosu | |
| 2007/0271014 A1 | 11/2007 | Breed | |
| 2008/0015763 A1 | 1/2008 | Kitazaki | |
| 2008/0065290 A1 | 3/2008 | Breed | |
| 2008/0086240 A1 | 4/2008 | Breed | |
| 2008/0103659 A1 | 5/2008 | Mancosu | |
| 2008/0129475 A1 | 6/2008 | Breed | |
| 2008/0140278 A1 | 6/2008 | Breed | |
| 2008/0156406 A1 | 7/2008 | Breed | |
| 2008/0216567 A1 | 9/2008 | Breed | |
| 2008/0284575 A1 | 11/2008 | Breed | |
| 2008/0289407 A1* | 11/2008 | Gramling | B60C 23/0411 73/146.5 |
| 2009/0043441 A1 | 2/2009 | Breed | |
| 2009/0105921 A1 | 4/2009 | Hanatsuka | |
| 2009/0118891 A1* | 5/2009 | Koguchi | B60C 23/064 701/31.4 |
| 2009/0186535 A1 | 7/2009 | Sullivan | |
| 2009/0281691 A1 | 11/2009 | Sakakibara | |
| 2009/0308149 A1 | 12/2009 | Kishida | |
| 2010/0057295 A1 | 3/2010 | Pannek | |
| 2010/0126263 A1* | 5/2010 | Brusarosco | B60C 23/0411 73/146 |
| 2010/0207754 A1 | 8/2010 | Shostak | |
| 2011/0023589 A1 | 2/2011 | Seitz | |
| 2011/0087396 A1* | 4/2011 | Eregen | B60C 23/0461 701/31.4 |
| 2011/0118989 A1 | 5/2011 | Morinaga | |
| 2011/0168310 A1 | 6/2011 | Fabing | |
| 2011/0162771 A1 | 7/2011 | Fabing | |
| 2012/0089299 A1 | 4/2012 | Breed | |
| 2013/0116972 A1 | 5/2013 | Hanatsuka | |
| 2013/0325323 A1 | 12/2013 | Breed | |
| 2014/0007683 A1 | 1/2014 | Guinart | |
| 2014/0336868 A1 | 11/2014 | Breed | |
| 2014/0358362 A1 | 12/2014 | Breed | |
| 2015/0005982 A1 | 1/2015 | Muthukumar | |
| 2015/0090022 A1 | 4/2015 | Uffenkamp | |
| 2015/0174967 A1 | 6/2015 | Lehmann | |
| 2015/0217607 A1* | 8/2015 | Singh | B60C 23/0488 152/510 |
| 2015/0283862 A1 | 10/2015 | Fabing | |
| 2015/0352903 A1 | 12/2015 | Ookawa | |
| 2015/0352906 A1 | 12/2015 | Nomura | |
| 2015/0362542 A1 | 12/2015 | De Sanctis | |
| 2017/0057306 A1 | 3/2017 | Suzuki | |
| 2017/0072922 A1 | 3/2017 | Hanatsuka | |
| 2017/0334254 A1* | 11/2017 | Limbrunner | B60C 11/246 |
| 2018/0079262 A1* | 3/2018 | Masago | B60C 11/24 |
| 2019/0025113 A1* | 1/2019 | Masago | B60C 23/04 |
| 2019/0118592 A1* | 4/2019 | Kollmitzer | B60C 23/061 |

OTHER PUBLICATIONS

Non Final Office Action dated Aug. 28, 2018 in connection with U.S. Appl. No. 15/788,088.
Non-Final Office Action dated Jun. 12, 2019 in connection with U.S. Appl. No. 15/788,088.

* cited by examiner

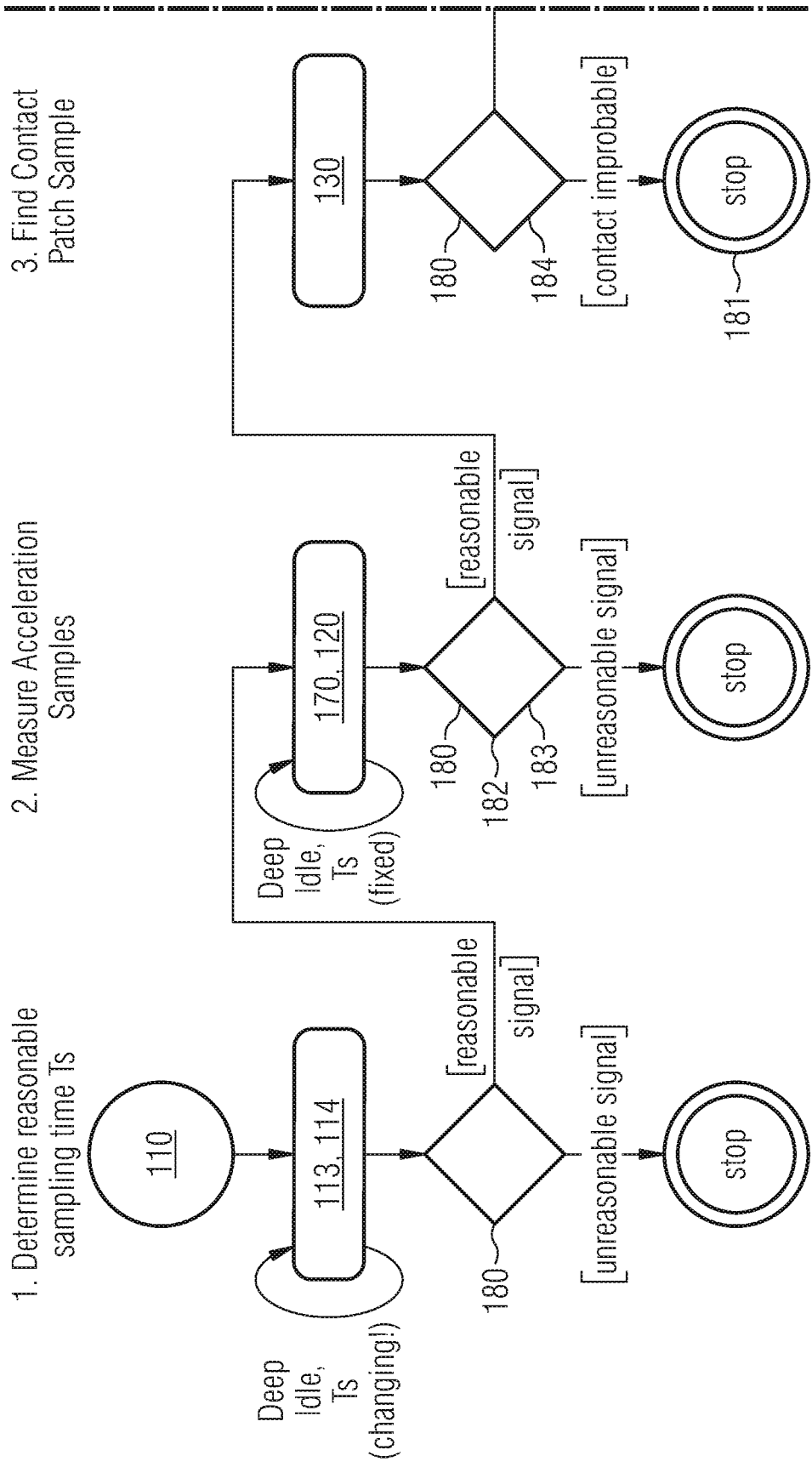

METHOD, COMPONENT, TIRE-MOUNTED TPMS MODULE, TPMS SYSTEM, AND MACHINE READABLE STORAGE OR COMPUTER PROGRAM FOR DETERMINING TIME INFORMATION OF AT LEAST ONE CONTACT PATCH EVENT OF A ROLLING TIRE, METHOD FOR LOCATING A TIRE

FIELD

Examples relate to tire pressure monitoring systems (TPMS) and to angular position sensing (APS), in particular but not exclusively, to a method, a component, a tire-mounted TPMS module, a TPMS system and a machine readable storage or computer program for determining time information of at least one contact patch event of a rolling tire and a method for locating a tire.

BACKGROUND

Tire pressure monitoring systems are traditionally used in automotive applications to monitor the inflation pressure of vehicle tires and to warn the driver in case of abnormal inflation.

Standard TPMS modules are valve-based, i.e. mounted on the valve and thus fixed to the rim. In contrast to valve-based TPMS modules, tire-mounted modules are mounted on the inner liner of the tire (mounted in the cavity of each tire).

For direct TPMS, modules—comprising at least of a pressure sensor, control logic, a radio frequency (RF) transmitter and a source for electrical energy—are mounted on the tire. Each module measures the inflation pressure and transmits this value together with module identification (ID) via RF to the electronic control unit (ECU) in the vehicle.

Localization describes the process of mapping the module IDs to the individual tires. This enables the TPMS to attribute the received inflation pressures to the individual tires and to signal which tire is abnormally inflated. Modern ECUs can perform tire localization automatically by synchronizing ABS (antilock braking system) wheel speed sensors with the angular positions of the TPMS modules (angular position sensing, APS). TPMS modules may measure their respective angular positions and transmit this information to the ECU for that purpose.

One way to do so with valve-based TPMS modules is by inferring the angular position from the direction of the earth's gravity, which is measured with accelerometers. The accelerations acting on such modules comprise mainly of the centrifugal acceleration due to the spinning wheel, mechanical vibrations, and the earth's gravity.

In contrast to valve-based TPMS modules, tire-mounted TPMS modules are mounted on the inner liner of the tire. As the tire spins during vehicle movement, such tire-mounted TPMS modules follow roughly a trajectory corresponding to the tire's circumference. In the vehicle-frame, i.e. a coordinate system which is fixed to the vehicle, the tires' circumferences and thus the trajectories resemble flattened circles, where the flat is determined by the contact patch (footprint) between the tire and the ground. Tire-mounted TPMS modules are thus subject to fundamentally different acceleration waveforms than valve-based TPMS modules. The gravity-based APS methods of valve-based modules are therefore inapplicable for tire-mounted modules.

SUMMARY

Examples of the present application may provide a reliable and charge-efficient APS for tire-mounted TPMS modules. Examples relate to a method, a component, a tire-mounted TPMS module, a TPMS system and a machine readable storage or computer program for determining time information of at least one contact patch event of a rolling tire and a method for locating a tire.

As used herein, a tire may be, in addition to any common usage in the art, any deformable rotating device, particularly one that deforms when it comes in contact with a surface. A tire does not have to be made of rubber or any particular material.

Examples provide a method for determining time information of the contact patch of a tire, the method comprising obtaining information indicative of a rotational rate of the tire, obtaining a sequence of samples indicative of at least an acceleration component during at least one rotation of the tire, and determining the time of a reference sample in the sequence, wherein the position of the reference sample is indicative of the time information of the contact patch event of the rolling tire. Examples may enable determining contact patch timing of a tire using a position of an acceleration reference sample in a sequence of acceleration reference samples. Further examples may enable tire localization from this information as well. The time information is representative of at least one temporal characteristic of the contact patch event. Such time information may comprise a single point during, a duration of, or some other time characteristic of the contact patch event.

Some examples may adapt the number of samples to the tire inflation pressure in order to save electric charge. With higher inflation pressures, the contact patch area reduces and the number of samples should be increased.

Some examples may determine an optimal sampling rate based on the information indicative of the rotational rate of the tire. The sampling rate could be reduced for slower rotational speeds in order to save electric charge.

The obtaining of the information indicative of the rotational rate of the tire may, in some examples, comprise determining information indicative of an acceleration component of the tire, and determining the information indicative of the rotational rate of the tire based on the acceleration component of the tire. Examples may enable using an acceleration value to estimate a rotational rate. In some examples, information indicative of a rotational rate of the tire may be determined by first estimating the tire revolution period $T_{rev}$ from a few preliminary acceleration samples (or similar method). Further examples may determine a sample rate for the preliminary samples indicative of the absolute radial acceleration component, wherein the sampling rate is updated after each sample is acquired.

The determining of the information indicative of the acceleration component of the tire may comprise obtaining at least two samples indicative of an absolute radial acceleration component, and determining an average of the at least two samples indicative of an absolute radial acceleration component. Averaging the at least two samples may increase the reliability or accuracy of the absolute radial acceleration component.

At least in some examples the obtaining of the information indicative of the rotational rate of the tire may comprise collecting preliminary samples indicative of at least an absolute radial acceleration component of the tire, determining an average absolute radial acceleration from the preliminary samples, and estimating the duration of a rotation of the tire based on the average absolute radial acceleration. A reliable absolute acceleration component value may be determined in some examples.

In some further example the method may comprise validating the samples of the sequence of samples based on the information indicative of the rotational rate of the tire. Validation may increase the reliability of the method. For example, the sequence of samples may be indicative of at least an absolute radial acceleration component. The obtaining information indicative of a rotational rate of the tire may comprise obtaining at least two samples indicative of an absolute radial acceleration component, and determining an average radial acceleration of the at least two samples indicative of the absolute radial acceleration component. The validation of the samples of the sequence of samples may comprise comparing at least one sample of the sequence of samples with the average radial acceleration of the at least two samples indicative of the absolute radial acceleration component, and aborting the method if at least one sample of the sequence of samples exceeds a predefined interval based on the average radial acceleration of the at least two absolute radial acceleration samples. The method may be aborted in case a sample is implausible. This would save electric charge, prevent the output of erroneous results and thus increase the robustness of the method.

The sequence of samples may be indicative of at least an absolute radial acceleration component. The obtaining of the information indicative of a rotational rate of the tire may comprise obtaining at least two samples indicative of an absolute radial acceleration component, and determining a first average radial acceleration of the at least two samples indicative of the absolute radial acceleration component. The validation of the samples of the sequence of samples may comprise determining a second average radial acceleration of the sequence of samples indicative of the radial acceleration component, aborting the method if a difference between the first and the second average radial acceleration exceeds a predefined threshold. The method may be aborted and energy may be conserved if a sample is implausible. Some example may use multiple plausibility checks of sample validations.

In some examples the sequence of samples is indicative of at least an absolute radial acceleration component. The validation of the samples of the sequence of samples may comprise determining a sequence of norm values. The sequence of norm values may be indicative of accumulated magnitudes of the differences of samples of the sequence of samples and variations of a sequence of reference values, and aborting the method if at least one norm value of the sequence of norm values exceeds a predefined threshold. Again, the method may be aborted and energy may be conserved in case if a norm value is implausible.

The determining of a position of a reference sample in the sequence may comprise determining information indicative of a match between the sequence of samples and variations of a sequence of reference values. The sequence of reference values may comprise at least one outlier value, wherein the variations of the sequence of reference values comprise variations of different locations of the outlier value within the sequence. The method may further comprise determining the position of the reference sample in the sequence of samples based on the match. Examples may enable low complexity match detection for determining the timing information.

In some examples the method may further comprise obtaining another sequence of samples indicative of at least the radial acceleration component during at least another rotation of the tire, determining another position of another reference sample in the other sequence, wherein the position of the other reference sample is indicative of the time information of the contact patch event of the rolling tire. Example may enable validation or verification of the time information of the contact patch event. The method may further comprise determining improved information indicative of the rotational rate of the tire based on the position of the reference sample and the other position of the other reference sample.

Example further provide a method for locating a tire on a vehicle based on time information of a contact patch event of a rolling tire, determined according one to the above methods. Example may enable locating a tire of a vehicle based on timing information of a contact patch event.

Examples further provide a component, unit, device or module for determining time information of a contact patch event of a rolling tire, comprising a sensor configured to measure at least a radial acceleration component of the tire, a controller coupled to the sensor. The controller is configured to obtain information indicative of a rotational rate of the tire, obtain a sequence of samples indicative of at least an acceleration component during at least one rotation of the tire, and determine a position of a reference sample in the sequence, wherein the position of the reference sample is indicative of the time information of the contact patch event of the rolling tire.

In further example the controller may be further configured to collect preliminary samples indicative of at least an absolute radial acceleration component of the tire, determine an average absolute radial acceleration from the preliminary samples, and estimate the duration of a rotation of the tire based on the average absolute radial acceleration. The controller may be further configured to validate the samples of the sequence of samples based on the information indicative of the rotational rate of the tire, in line with the above. The controller may be configured to determine information indicative of a match between the sequence of samples and variations of a sequence of reference values, wherein the sequence of reference values comprises at least one outlier value. The variations of the sequence of reference values comprise variations of different locations of the outlier value within the sequence. The controller may be further configured to determine the position of the reference sample in the sequence of samples based on the match.

In some examples the controller is further configured to obtain another sequence of samples indicative of at least the radial acceleration component during at least another rotation of the tire, and determine another position of another reference sample in the other sequence, wherein the position of the other reference sample is indicative of the time information of the contact patch event of the rolling tire.

Examples further provide a tire-mounted TPMS module comprising the above component, device, unit or module. Examples further comprise a TPMS system comprising a transmitter, a receiver, and a tire-mounted TPMS module according to the above.

Examples also provide a machine readable storage including machine readable instructions to determine time information of at least one contact patch event of a rolling tire, that when executed obtain information indicative of a rotational rate of the tire, obtain a sequence of samples indicative of at least an acceleration component during at least one rotation of the tire, and determine a position of a reference sample in the sequence, wherein the position of the reference sample is indicative of the time information of the contact patch event of the rolling tire.

In some examples, a second sequence of samples indicative of at least an acceleration component during at least a second rotation of the tire is obtained, and a position of a second reference sample in the second sequence is determined, wherein the position of the second reference sample is indicative of the time information of a second contact patch event of the rolling tire. Thus, two consecutive contact patch positions and their timing information are known. The time between these consecutive contact patches may be a precise measure for the tire revolution period $T_{rev}$, which could be compared against its initial estimate.

Various examples further comprise validating the samples. In some examples, at least one of the samples of the sequence of samples is compared to the average of the preliminary acceleration samples, and the method is aborted if the difference exceeds a predefined interval. In other examples, additionally or alternatively, the average of the sequence of samples is compared to the average of the preliminary acceleration samples, and the method is aborted if the difference exceeds a predefined interval. Still further examples may, additionally or alternatively, determine the norm values of the sequence of samples and abort the method if the norm values exceed a predefined interval. Examples may comprise one or more ways to validate the samples.

Examples provide a device, component, unit or module for determining time information of a contact patch event of a tire. The device may comprise a sensor capable of measuring at least an acceleration component, ideally a radial acceleration component, and a circuit configured to perform the method for determining time information of the contact patch event of the tire.

Examples provide a TPMS comprising the device for determining time information of a contact patch event of a tire. Further examples comprise a transmitter and receiver.

Examples further provide a computer program product comprising a computer readable medium having computer readable program code embodied therein, the computer readable program code being configured to implement at least one of or a combination of the above-described methods, when being loaded on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong. In the following figures optional components, actions or steps are shown in broken lines.

Figure 1A:
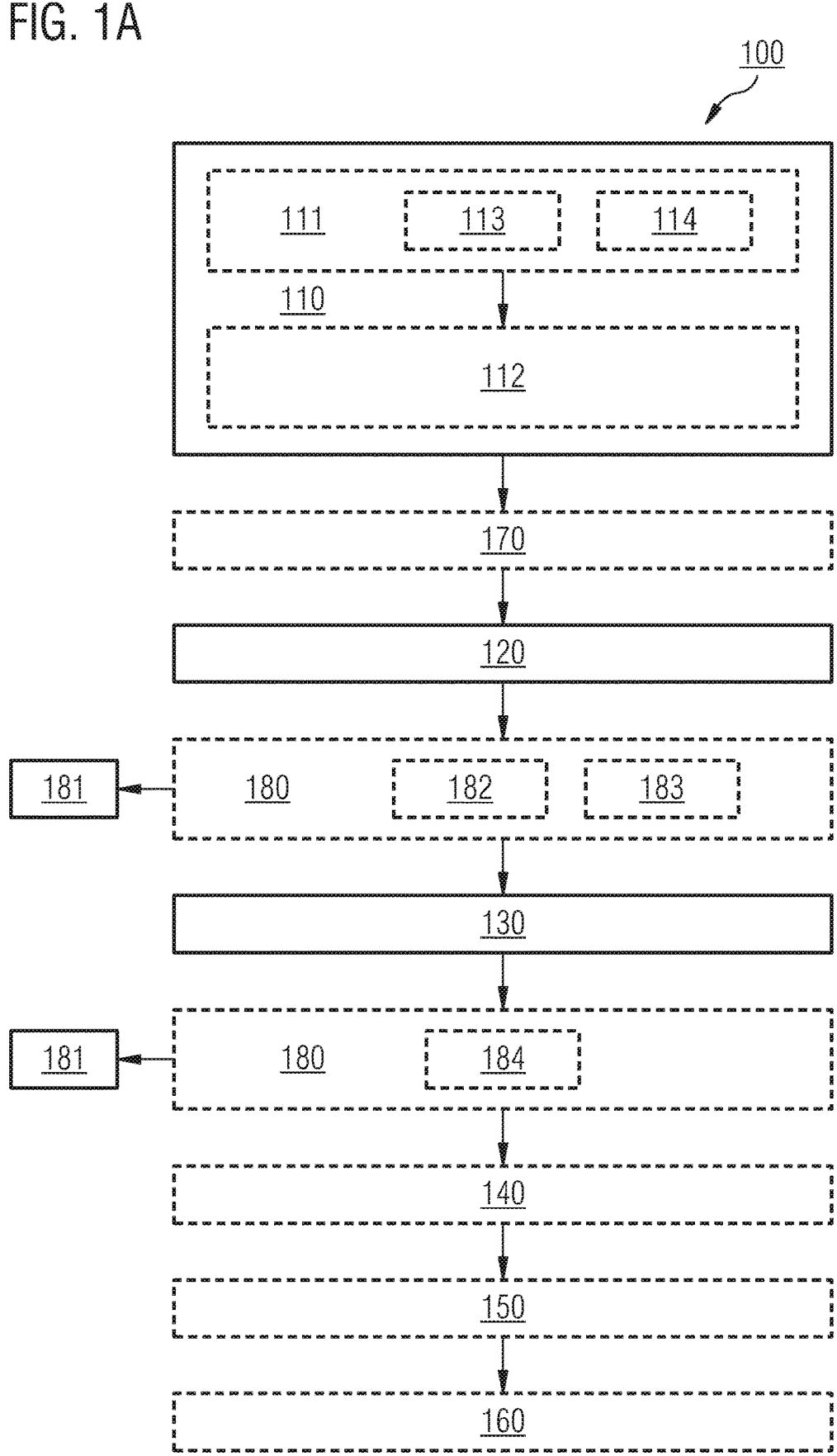
FIG. 1A shows a flow chart of examples of a method for determining the time information of a contact patch event of a tire.
Figures 1, 1B, 2:
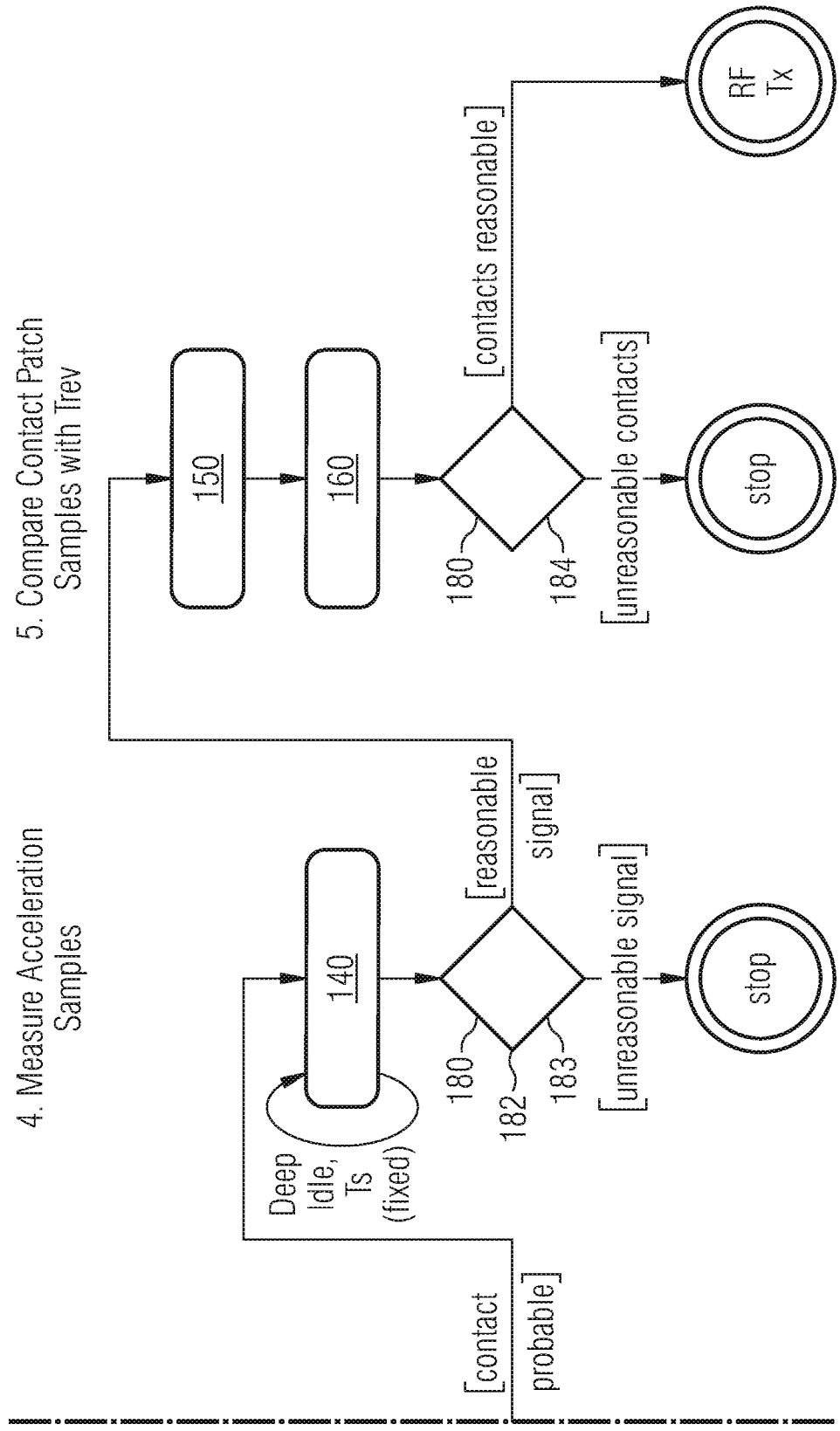
FIG. 1B shows a flow chart of an exemplary example of the method of FIG. 1A.
FIG. 2 shows a schematic cross-section of a tire with a tire-mounted TPMS module.
Figure 2:
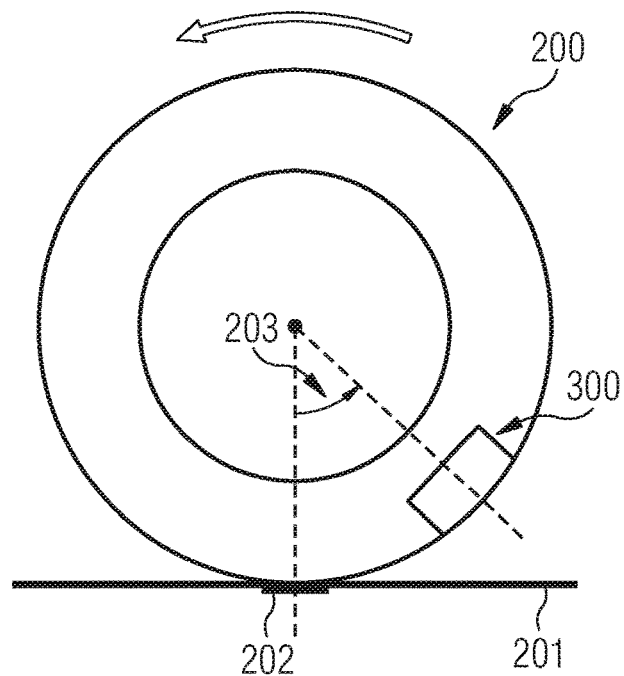

FIG. 2 shows a schematic cross-section of a tire 200 with a tire-mounted TPMS module 300. The wheel or tire 200 with the tire-mounted TPMS module 300 rolls counter-clockwise on a surface or road. The tire 200 forms a contact patch 202 with the road 201 as it rotates. An angle 203 is formed between the tire-mounted module 300 and the normal to the road. The angular position ϕ can be defined as the angle spanning between the TPMS module and the vertical axis. A "contact patch event" occurs when the tire-mounted module 300 is located in the contact patch 202. In other words, the contact patch event occurs when the outer surface of the tire where the module 300 is mounted touches the road surface 201.

Figure 5:
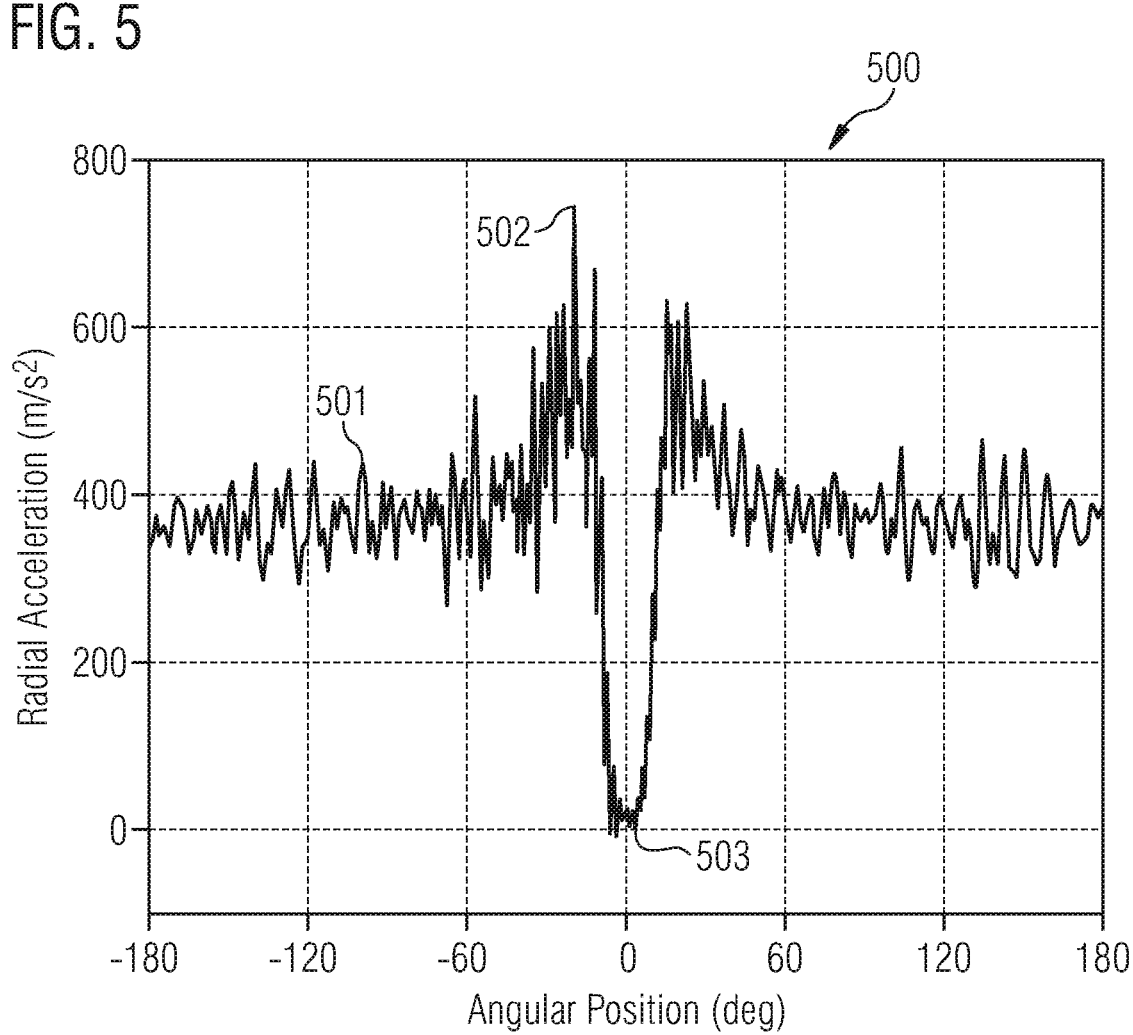
FIG. 5 is a representative graph of the radial acceleration profile of the tire.

FIG. 5 is a representative graph 500 of the radial acceleration profile of the tire plotted against the angular position (in degrees). FIG. 5 shows a typical acceleration-signal acquired by a radial accelerometer of a tire-mounted TPMS module. Ignoring higher frequency components, most of the data is constant and lies close to the baseline 501 (close to 400 m/s² for the exemplary signal in FIG. 5), when the tire-mounted TPMS module 300 is not in the contact patch (acceleration samples acquired in this region are furthermore denoted as a[i]). As the module 300 enters the contact patch event, a sharp spike in the acceleration profile occurs at 502 followed by a near-zero reading during the contact patch event 503 (acceleration samples acquired in the contact patch are furthermore denoted as a[j]).

Under slip-free conditions, the tire itself rolls over sections which touch the road surface (i.e. the contact patch), while these sections are virtually stationary. Thus, a TPMS module experiences virtually no acceleration when passing through this contact patch (i.e. the contact patch event). Further assuming a freely rolling wheel, i.e. a wheel on which no torque is applied, this contact patch coincides with the angular position defined as φ=0 (i.e. the angle formed normal to the ground). Because the nearly vanishing acceleration during the contact patch event is so prominent, the subsequent angular position can be estimated, which makes it convenient to use this feature for tire localization.

FIG. 1A shows a flow chart of examples of a method 100 for determining the time information of a contact patch event of a tire. The method comprises step 110, obtaining information indicative of a rotational rate of the tire, step 120, obtaining a sequence of samples indicative of at least an acceleration component during at least one rotation of the tire, and step 130, determining a position of a reference sample in the sequence of samples, wherein the position of the reference sample is indicative of the time information of the contact patch event of the rolling tire.

In some examples, step 110 may comprise step 111 determining information indicative of an acceleration component of the tire and step 112 determining the information indicative of the rotational rate of the tire based on the acceleration component of the tire. Other examples may determine the information indicative of the rotational rate using other ways or combinations with other ways. For example, a number of sensors are known to determine information on a rotational rate of a tire, gravitational sensors, ABS sensors, optical sensors, etc. are conceivable.

The acceleration of a tire-mounted TPMS module is nearly constant for the largest part of the tire revolution (apart from mechanical vibrations). In this part, the acceleration is mainly determined by the centrifugal acceleration. The centrifugal acceleration $a_{cf}$ on a circular trajectory with a radius R and a velocity v is given by the equation $$a_{cf} = v^2/R. \qquad (1)$$

In the contact patch, however, when the module is close to the road surface, the acceleration experienced by the TPMS module is nearly zero. Shortly before entering and leaving the contact patch, the tire has to deform significantly. This increases the local curvature of the TPMS module's trajectory. Thus, the experienced acceleration is also increased.

The information on the rotational rate of the tire may be determined by deriving $T_{rev}$ from the average radial acceleration <a> and the geometrical tire radius R via the formula $$T_{rev} = 2\pi\sqrt{R/\langle a\rangle}. \qquad (2)$$

For tire-mounted TPMS modules, the average radial acceleration agrees reasonably well with the centrifugal acceleration calculated from Eq. (1), where R is approximated by the geometrical tire radius and v by the tire's velocity. Therefore, the velocity can be calculated from the average radial acceleration. Without slip, the velocity v is related to the period of the revolution $T_{rev}$ and the effective tire radius $R_{eff}$ via the equation $$v = 2\pi R_{eff}/T_{rev}. \qquad (3)$$

For a well-inflated tire, this effective radius is only marginally smaller than the geometrical radius. Thus, set $R_{eff}=R$ in Eq. (3), and calculate $T_{rev}$ from the average acceleration ⟨a⟩ according to Eq. (2). Instead of the arithmetic mean ⟨a⟩, in other examples one could use the median in this equation. This could improve the robustness against outliers at slightly increased computational demand.

In some examples, the information indicative of a rotational rate is determined by averaging the measured absolute radial acceleration samples, and determining $T_{rev}$ through the use of Eq. (2). Generally, the method may comprise obtaining at least two preliminary samples indicative of an absolute radial acceleration component, and determining an average of the at least two samples indicative of an absolute radial acceleration component. While acquiring the preliminary samples, a cumulative moving average (or calculated median) can be used, updating the sampling time $T_s$ according to $T_s=T_{rev}/N$ after every acquisition. In other words, whenever a new sample is acquired, the (updated) average acceleration, $T_{rev}$, is calculated and then the sampling time $T_s$ can be calculated, which is used for the next sample. Measurements and simulations have shown that few, e.g. four, acceleration samples suffice to estimate $T_{rev}$, if these samples are also sampled at reasonable intervals.

In some examples, whenever a new sample is acquired, the average (median) acceleration is estimated, from which an optimal sampling time Ts is estimated and subsequently used for the next sample. The following pseudocode explains the intended behavior with an implementation of the cumulative moving average:

```
Number_Of_Preliminary_Samples = 4
Sample_Sum = 0
Sample_Counter = 0
while (Sample_Counter < Number_Of_Preliminary_Samples)
{
    Sample_Sum += AcquireAccelerationSample( )
    Sample_Counter ++
    Sample_Average = Sample_Sum / Sample_Counter
    Trev = 2*pi*sqrt(R / Sample_Average)
    Ts = Trev / N
    wait(Ts)
}
return(Ts)
```

Of course, the calculated sampling times Ts might have to be mapped onto the range of realizable sampling times on a specific hardware.

Summarizing, in some examples obtaining the information indicative of the rotational rate of the tire comprises collecting preliminary samples indicative of at least an absolute radial acceleration component of the tire, determining an average absolute radial acceleration from the preliminary samples 113, updating the sampling time after each preliminary sample is taken 114, and estimating the duration of a rotation of the tire based on the average absolute radial acceleration 112.

In order to guarantee that at least one contact patch event occurs, at least a certain number N of samples have to be acquired per tire revolution. For properly inflated tires and reasonable tire load, the contact patch length will remain within a certain range. This range determines the necessary number N of samples per tire revolution. The number N of samples per tire revolution could be adapted based on the inflation pressure. For TPMS (tire pressure monitoring system) modules, determining the inflation pressure is of course easily accomplished. With increasing inflation pressure, the contact patch length decreases and the number N of samples per tire revolution should be increased as well.

Some examples comprise step 170, wherein the sampling rate $T_s$ to be used in step 120 is determined. In some examples the method comprises determining a sample rate for the samples of the sequence of samples based on the information indicative of the rotational rate of the tire. This can be quickly determined from $T_s=T_{rev}/N$. At the end of step 170, the tire revolution period $T_{rev}$, the potentially optimal sampling time $T_s$, and the average (median) acceleration $\langle a \rangle$ are available with a sufficient precision.

During the sampling step 120, the N acceleration samples are acquired within the sampling time $T_s$, and stored in the memory. Because $T_{rev}=N*T_s$, this sampling lasts in total for one tire revolution. Alternatively, one could acquire more samples for a longer time span, e.g. $1.2*T_{rev}$, as guard against eventual errors. The acceleration samples in the following are denoted by a[i], where the sample counter i runs from 0 to (N−1).

As a guard against potential errors, and in order to save precious charge in the tire-mounted module, several examples involve 180 validating the obtained data and 181 aborting the method if the data exceeds a predefined threshold. Thus, the system can avoid wasting energy on invalid data collection, processing, and/or transmission.

Some example method may comprise validating the samples of the sequence of samples based on the information indicative of the rotational rate of the tire. In example, there are several options for validation steps, combinations thereof respectively.

One validation step, 182, involves comparing every freshly acquired acceleration sample against a certain interval. This interval can be derived from the average (median) $\langle a \rangle$ from step 113. A reasonable interval could be, e.g. [−0.1, 2]*$\langle a \rangle$. If a sample is not within this interval, the method should be aborted. This measure potentially saves charge in case of bad signal quality, e.g. due to bad road conditions. In other words, in an example obtaining information indicative of a rotational rate of the tire may comprise obtaining at least two samples indicative of an absolute radial acceleration component, and determining an average radial acceleration of the at least two samples indicative of the absolute radial acceleration component. The validation of the samples of the sequence of samples may comprises comparing at least one sample of the sequence of samples with the average radial acceleration of the at least two samples indicative of the absolute radial acceleration component, and aborting the method if at least one sample of the sequence of samples exceeds a predefined interval based on the average radial acceleration of the at least two absolute radial acceleration samples.

Another validation step, 183, involves updating the average (median) acceleration $\langle a \rangle$ from the acquired samples, and comparing it with the average (median) value from step 113. Once again, if the sample is not within a predefined interval, the method should be aborted. Hence, some examples may, additionally or alternatively apply other validation steps. The sequence of samples is, for example, indicative of at least an absolute radial acceleration component. The obtaining information indicative of a rotational rate of the tire may comprise obtaining at least two samples indicative of an absolute radial acceleration component, and determining a first average radial acceleration of the at least two samples indicative of the absolute radial acceleration component. The validation of the samples of the sequence of samples may comprise determining a second average radial acceleration of the sequence of samples indicative of the radial acceleration component, and aborting the method if a difference between the first and the second average radial acceleration exceeds a predefined threshold.

By design of the previous steps, the basic features of the acquired samples a[i] are already known. This simplifies the analysis and allows the assessment of the data quality, which further helps preventing erroneous outputs.

In step 130, the basic features of the data are as follows (see also FIG. 5):

Most samples a[i] are close to the average (median) acceleration $\langle a \rangle$ 501;

At least one sample a[j] 503 is acquired in the contact patch ("reference sample"), whose value is close to zero;

For optimal noise robustness, it is suggested to fit the data a[i] with an adjustable function f, which captures these features. For example, this function can be $$f(i, j) = \begin{cases} \langle a \rangle & \text{if } i \neq j \\ 0 & \text{if } i = j. \end{cases} \quad (4)$$

where the average (median) of the acquired samples a[i] is used to estimate the average (median) acceleration $\langle a \rangle$, and the index j corresponds to the reference sample.

Thus, the position of the reference sample can be determined by fitting this function to the data. It is only necessary to calculate N variables, which are given by $\Delta X(j)=|a[j]|-|a[j]-\langle a \rangle|$, where j runs from 0 to (N−1), and to determine their minimum.

The index of the contact patch sample is then given by the index j, which minimizes $\Delta X(j)=|a[j]|$ at 130. In an example method the determination of a position of a reference sample in the sequence may comprise determining information indicative of a match between the sequence of samples and variations of a sequence of reference values. The sequence of reference values comprises at least one outlier value and the variations of the sequence of reference values comprise variations of different locations of the outlier value within the sequence. The method may comprise determining the position of the reference sample in the sequence of samples based on the match.

Another validation step, 184, can now be performed. The fit quality can be assessed from the norm X(j) of the residuals after the fit. If the norm of the residuals is too large, the execution should be aborted in order to save charge. In other words, in some examples the sequence of samples is indicative of at least an absolute radial acceleration component. The validation of the samples of the sequence of samples may then comprise determining a sequence of norm values. The sequence of norm values may be indicative of accumulated magnitudes of the differences of samples of the sequence of samples and variations of a sequence of reference values. The validation may further comprise aborting the method if at least one norm value of the sequence of norm values exceeds a predefined threshold.

For example, define the 1-norm of the residuals as function of the index j as $$X(j) = \sum_{i=0}^{N} |a[i] - f(i, j)|. \quad (3)$$

Inserting Eq. (4) into Eq. (3) and completing the sum yields directly $$X(j) = |a[j]| + \sum_{i \neq j} |a[i] - \langle a \rangle| = |a[j]| - |a[j] - \langle a \rangle| + \sum_{i=0}^{N} |a[i] - \langle a \rangle|. \quad (4)$$

The right-most sum of this equation is the 1-norm for a set of data without contact patch samples, which can be denoted by $$X_0 = \sum_{i=0}^{N} |a[i] - \langle a \rangle|. \quad (5)$$

Introducing a further abbreviation $\Delta X(j)=|a[j]|-|a[j]-\langle a \rangle|$, allows us to write $$X(j)=\Delta X(j)+X_0. \quad (6)$$

The best match to the data is given by the minimum of the residual norm, i.e. the minimum of $\{X_0, X(j)\}$. From Eq. (6), this can be found to be equivalent to finding the minimum of $\{0, \Delta X(j)\}$.

It should be understood, that uncompensated raw acceleration measurements can be used instead of fully compensated acceleration samples. This would save considerable electric charge for the compensation functions.

Various examples may comprise one or more of validation steps 182, 183, and/or 184.

Other examples may comprise additional steps 140 and 150. Step 140 repeats the process of step 120 in order to obtain a second sequence of samples. Step 150 repeats the process of step 130 in order to determine a second reference sample in the second sequence of samples. Any of the aforementioned validation steps 180, 182, 183, and/or 184 (or other validation steps) may be performed during steps 140 and/or 150. Hence, in some examples the method may comprise obtaining another sequence of samples 140 indicative of at least the radial acceleration component during at least another rotation of the tire, and determining another position of another reference sample 150 in the other sequence. The position of the other reference sample is indicative of the time information of the contact patch event of the rolling tire. The method may further comprise determining improved information indicative of the rotational rate of the tire 160 based on the position of the reference sample and the other position of the other reference sample.

After step 150, two consecutive contact patch events are known (by means of the two reference samples). Thus, in step 160, $T_{rev}$ can be determined with great accuracy by finding the time difference between these two consecutive contact patch events. This value can then be compared to the estimated value in step 110.

FIG. 1B shows a flow chart of an exemplary example of the method 100. The example begins at step 110, obtaining information indicative of a rotational rate of the tire. Next, we take some preliminary samples (step 113) followed by determining a reasonable sampling time, Ts (step 114). Preliminary acceleration measurements are taken, the moving average is updated and the equation $T_s=T_{rev}/N$ is used to update the sampling interval (hence the $T_s$ is changing) in step 1 of FIG. 1B. This calculation is performed for every newly acquired acceleration sample.

In one example, the available data is validated after every processing step (step 180; also denoted by the dark diamonds). If the data is unreasonable, the method is aborted. This saves precious charge in the tire-mounted module.

In step 2 of FIG. 1B, the sequence of samples is obtained 120. Another optional validation step 180 occurs, employing the methods of steps 182 and/or 183 as previously explained. As always, if the data is unreasonable the method is aborted.

In step 3 of FIG. 1B, the position of the reference sample is determined 130. Once again, an optional validation step 180 such as the method of step 184 occurs. As always, if the data is unreasonable the method is aborted.

In step 4 of FIG. 1B, a second sequence of samples is obtained 140. Another optional validation step 180 occurs, such as the methods of steps 182 and/or 183. As always, if the data is unreasonable the method is aborted.

In step 5 of FIG. 1B, the position of the second reference sample is determined 150. Now that two consecutive patches are known, it is possible to determine a more accurate value for $T_{rev}$ 160. Once again, an optional validation step 180 such as the method of step 184 occurs. If the data is unreasonable the method is aborted.

Figure 6:
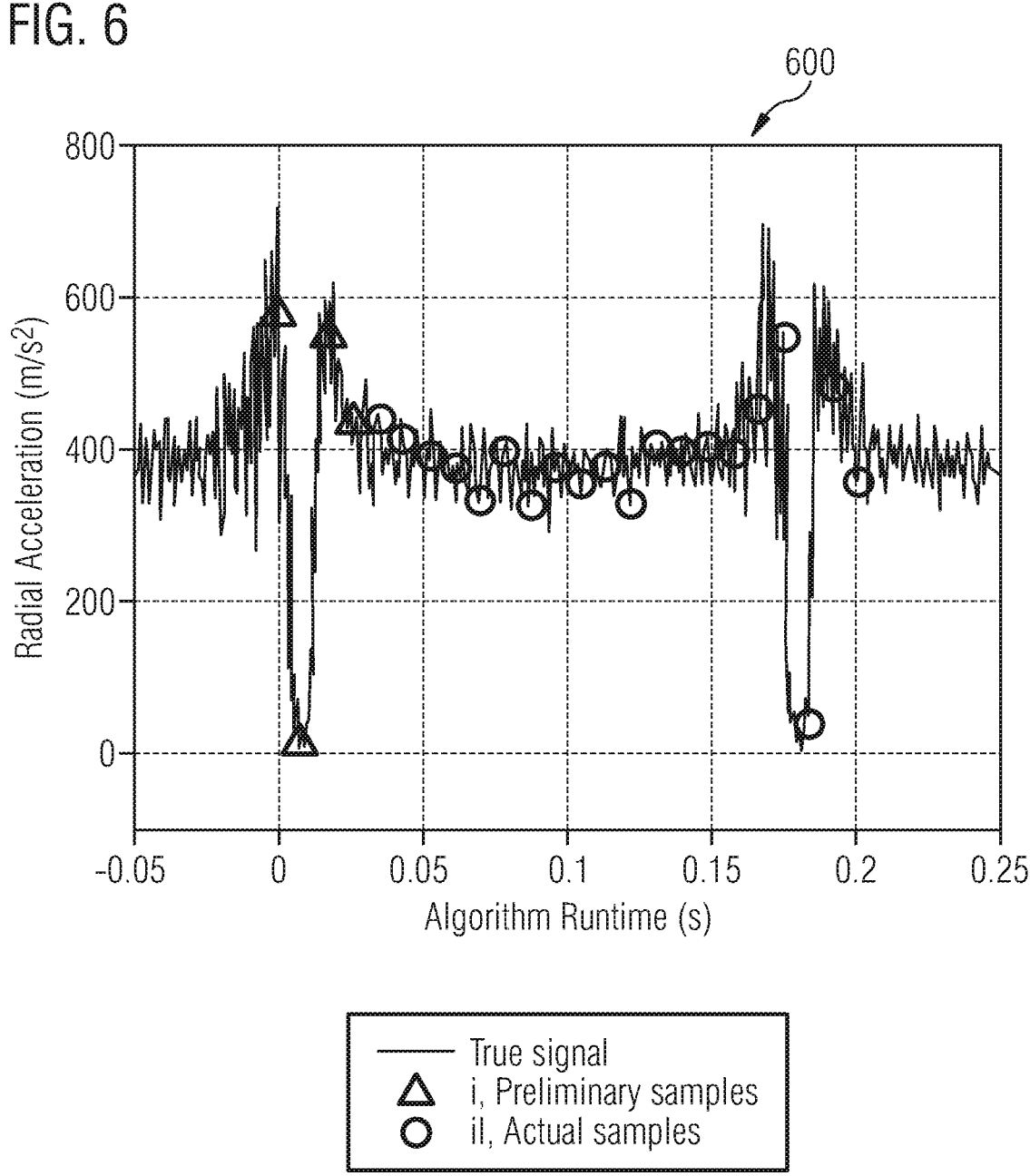
FIG. 6 is another representative graph of the radial acceleration profile of the tire.

FIG. 6 is a representative graph 600 of the radial acceleration profile of tire-mounted TPMS module plotted against time as measured during the preliminary 113 and actual sampling 120 steps, as will be detailed subsequently. Since the tire rotates with a constant angular velocity, the angular position increases linearly with time and the acceleration profile shares the same signature as that of FIG. 5. FIG. 6 shows an example of a typical acceleration-signal (solid line). After acquisition of a few, e.g. four, preliminary samples (triangles; step 113), the tire revolution period $T_{rev}$ is estimated (step 112). In this example, $T_{rev}$ is estimated as 0.17 s. For a subsequent timespan of $T_{rev}$, the sampling time for the sequence of samples is determined (step 170), and the sequence of acceleration samples is acquired (circles; step 120). In step 130, the data is post-processed to locate the contact patch event. In this example, it would be detected at the algorithm runtime of 0.18 s.

The disclosed method consists of a reliable and charge-efficient APS for tire-mounted TPMS modules. It is structured into three basic steps, see also FIG. 1A.

a) 110, first, the tire revolution period Trev is estimated from a few preliminary acceleration samples with the help of Eq. (2).

b) 120, subsequently, a pre-defined number of acceleration samples are acquired within the time of one tire revolution.

c) 130, finally, the acquired samples are post-processed to locate the contact patch.

In order to improve the confidence in the result, the algorithm steps (b)-(c) can be repeated, steps 140 and 150. Thus, two consecutive contact patches would be available. The time between these consecutive contact patches is a precise measure for the tire revolution period Trev 160, which could be compared against its initial estimate from step (a).

Figure 3:
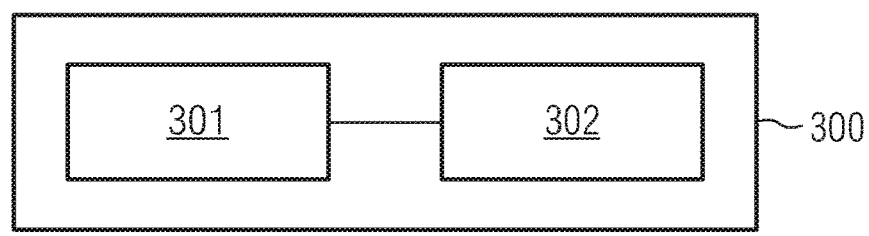
FIG. 3 shows a block diagram of an example of a tire-mounted TPMS module.

FIG. 3 shows a block diagram of an example of a tire-mounted module 300. The tire-mounted TPMS module comprises a sensor 301 configured to obtain the data, and capable of measuring at least an acceleration component and a controller 302, coupled to the sensor, configured to perform the various steps of the method 100 in conjunction with the sensor. In some examples, a component for determining time information of a contact patch event of a rolling tire comprises a sensor 301 configured to measure at least a radial acceleration component of the tire and a controller 302 coupled to the sensor, the controller being configured to perform steps 110, 120, and 130 through use of the sensor.

In other examples, the controller 302 may be further configured to collect preliminary samples indicative of at least an absolute radial acceleration component of the tire 111 and to determine an average absolute radial acceleration from the preliminary samples 113, and to estimate the duration of a rotation of the tire based on the average absolute radial acceleration 112.

In other examples, the controller 302 may be further configured to validate the samples 180 of the sequence of samples based on the information indicative of the rotational rate of the tire. This validation may employ one or more of the method of steps 182, 183, 184, and/or other possible validation methods. For example, the controller 302 may be configured to determine information indicative of a match between the sequence of samples and variations of a sequence of reference values, wherein the sequence of reference values comprises at least one outlier value and the variations of the sequence of reference values comprise variations of different locations of the outlier value within the sequence, and to determine the position of the reference sample in the sequence of samples based on the match.

In still further examples, the controller 302 may be further configured to 140 obtain another sequence of samples indicative of at least the radial acceleration component during at least another rotation of the tire, and to 150 determine another position of another reference sample in the other sequence. The position of the other reference is indicative of time information of the contact patch event of the rolling tire.

Examples may relate to a tire-mounted TPMS module comprising the component 300.

Figure 4:
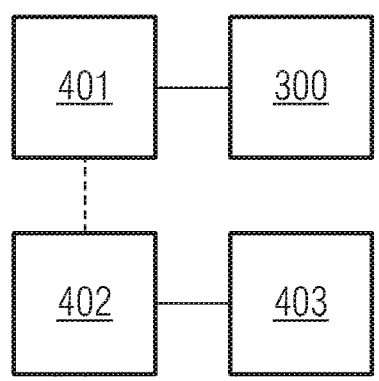
FIG. 4 shows a block diagram of an example of a tire-mounted TPMS system.

FIG. 4 shows a block diagram of an example of a tire-mounted TPMS system 400. The TPMS system 400 comprises a transmitter 401 coupled to the tire-mounted TPMS module 300. Examples also comprise a receiver 402 coupled to an ECU 403 or similar processor for further data processing. One skilled in the art can appreciate that additional circuit components (not shown) may be necessary, such as an analog-to-digital convertor, a memory module, or a power source.

Figure 7A:
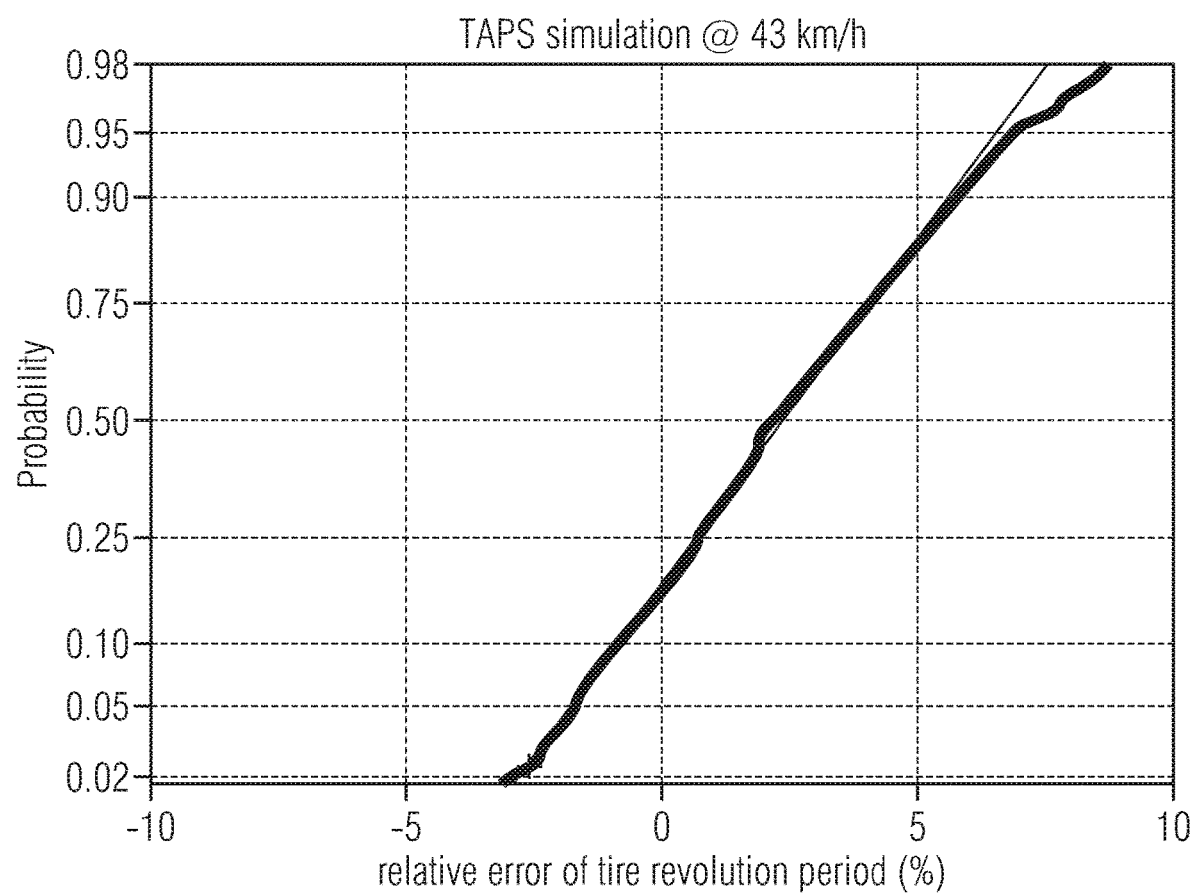
FIG. 7A shows a graph of the relative error of the tire revolution period.
Figure 7B:
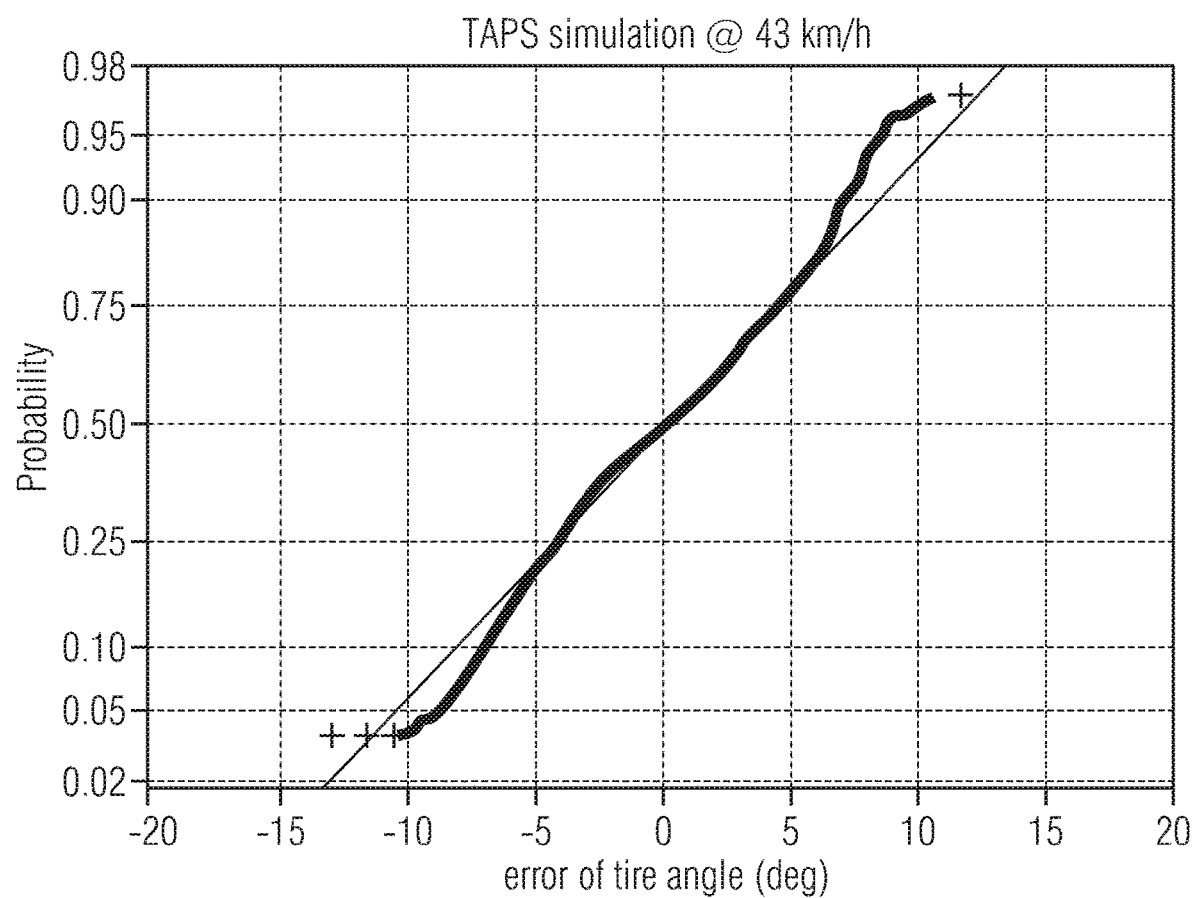
FIG. 7B shows a graph of the error of the angular position of the tire.

FIGS. 7A and 7B show the error of the tire revolution period and angular position based on drive data acquired by a test rig while driving at 43 km/hr. FIG. 7A shows a graph of the relative error of the tire revolution period. FIG. 7B shows a graph of the error of the angular position of the tire.

Figure 8:
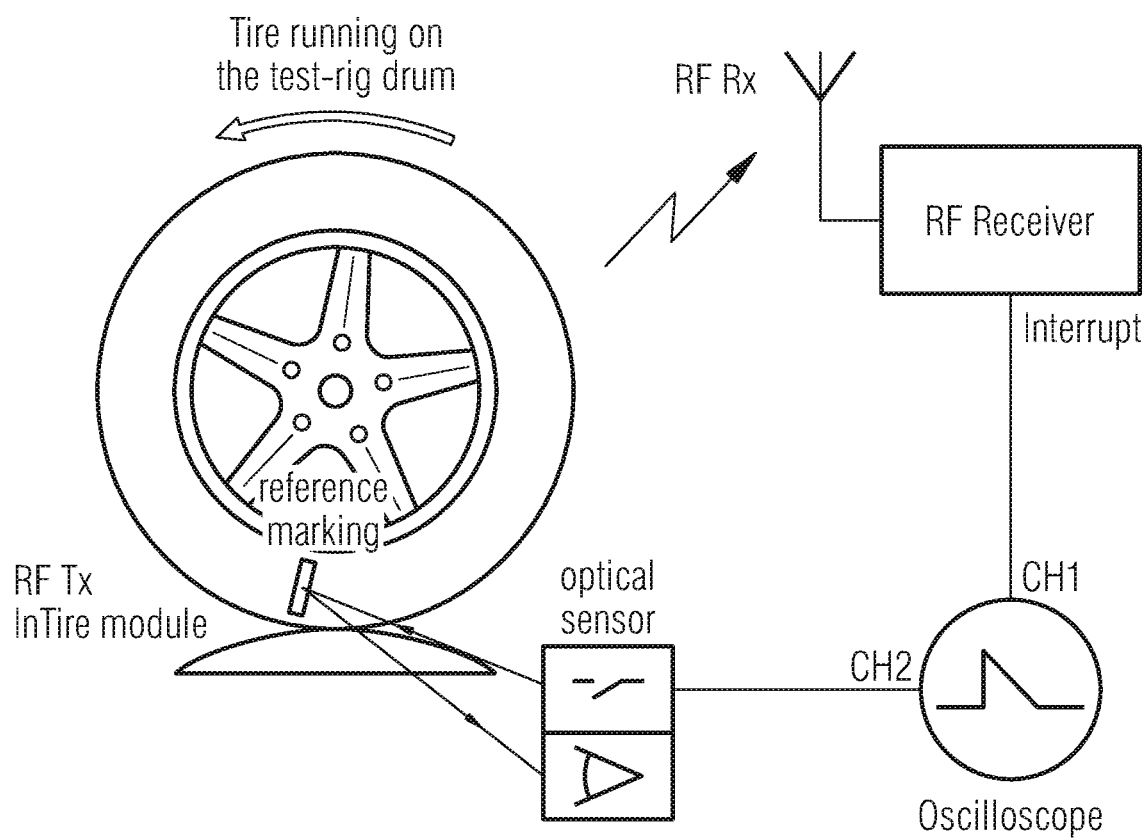
FIG. 8 shows the setup of a test rig.

FIG. 8 shows an example of a test rig setup. A tire with tire-mounted TPMS module was set-up and the method 100 performed. The correct (reference) angular position of the TPMS module was determined from an external optical sensor, which detected the periodical passing of a marking. This marking (white line) was painted on the tire at the very same angular position, at which the TPMS module was mounted.

The TPMS module transmitted an RF packet, when it expected to have passed the angular position of the optical sensor. These packets were received from an RF receiver, which generated according interrupt signals.

The time difference between the reference signal and the interrupt signal was measured by an oscilloscope and assessed visually. The assessed data showed a very good correlation with the reference signal.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining a time information of at least one contact patch event of a rolling tire, comprising:
   obtaining information indicative of a rotational rate of the tire;
   obtaining a sequence of samples indicative of at least an acceleration component during at least one rotation of the tire; and
   determining a position of at least one reference sample in the sequence, wherein the position of the at least one reference sample is indicative of the time information of the contact patch event of the rolling tire.

2. The method of claim 1, further comprising:
   determining a sample rate for the samples of the sequence of samples based on the information indicative of the rotational rate of the tire.

3. The method of claim 1, wherein the obtaining of the information indicative of the rotational rate of the tire comprises:
   determining information indicative of the acceleration component of the tire; and
   determining the information indicative of the rotational rate of the tire based on the acceleration component of the tire.

4. The method of claim 3, wherein the determining of the information indicative of the acceleration component of the tire comprises:
   obtaining at least two samples indicative of an absolute radial acceleration component; and
   determining an average of the at least two samples indicative of an absolute radial acceleration component.

5. The method of claim 4, further comprising:
   determining a sample rate for the at least two samples indicative of the absolute radial acceleration component, wherein the sampling rate is updated after each sample is acquired.

6. The method of claim 1, further comprising:
   validating the sequence of samples based on the information indicative of the rotational rate of the tire.

7. The method of claim 6, wherein the sequence of samples is indicative of at least an absolute radial acceleration component, wherein obtaining information indicative of a rotational rate of the tire comprises:
   obtaining at least two samples indicative of an absolute radial acceleration component, and
   determining an average radial acceleration of the at least two samples indicative of the absolute radial acceleration component;
   wherein the validation of the sequence of samples comprises:
   comparing at least one sample of the sequence of samples with the average radial acceleration of the at least two samples indicative of the absolute radial acceleration component; and
   aborting the method if at least one sample of the sequence of samples exceeds a predefined interval based on the average radial acceleration of the at least two absolute radial acceleration samples.

8. The method of claim 6, wherein the sequence of samples is indicative of at least an absolute radial acceleration component, wherein obtaining information indicative of a rotational rate of the tire comprises:
   obtaining at least two samples indicative of an absolute radial acceleration component; and
   determining a first average radial acceleration of the at least two samples indicative of the absolute radial acceleration component;
   wherein the validation of the sequence of samples comprises:
   determining a second average radial acceleration of the sequence of samples indicative of the radial acceleration component;
   aborting the method if a difference between the first and the second average radial acceleration exceeds a predefined threshold.

9. The method of claim 6, wherein the sequence of samples is indicative of at least an absolute radial acceleration component, wherein the validation of the sequence of samples comprises:
   determining a sequence of norm values, wherein the sequence of norm values is indicative of accumulated magnitudes of the sequence of samples;
   aborting the method if at least one norm value of the sequence of norm values exceeds a predefined threshold.

10. The method of claim 1, wherein the determining of a position of at least one reference sample in the sequence comprises:
    determining information indicative of a match between the sequence of samples and variations of a sequence of reference values, wherein the sequence of reference values comprises at least one outlier value, wherein the variations of the sequence of reference values comprise variations of different locations of the outlier value within the sequence, and
    determining the position of the at least one reference sample in the sequence of samples based on the match.

11. The method of claim 1, further comprising:
    obtaining another sequence of samples indicative of at least the radial acceleration component during at least another rotation of the tire;
    determining another position of another at least one reference sample in the other sequence, wherein the position of the at least one other reference sample is indicative of the time information of the contact patch event of the rolling tire.

12. The method of claim 11, further comprising:
determining improved information indicative of the rotational rate of the tire based on the position of the at least one reference sample and the other position of the at least one other reference sample.

13. A method for locating a tire on a vehicle based on time information of a contact patch event of a rolling tire, determined according to the method of claim 1.

14. A component for determining a time information of a contact patch event of a rolling tire, comprising:
a sensor configured to measure at least a radial acceleration component of the tire; and
a controller coupled to the sensor, the controller being configured to:
obtain information indicative of a rotational rate of the tire;
obtain a sequence of samples indicative of at least an acceleration component during at least one rotation of the tire;
determine a position of at least one reference sample in the sequence, wherein the position of the at least one reference sample is indicative of the time information of the contact patch event of the rolling tire.

15. The component of claim 14, wherein the controller is further configured to:
collect preliminary samples indicative of at least an absolute radial acceleration component of the tire;
determine an average absolute radial acceleration from the preliminary samples; and
estimate the duration of a rotation of the tire based on the average absolute radial acceleration.

16. The component of claim 14, wherein the controller is further configured to:
validate the samples of the sequence of samples based on the information indicative of the rotational rate of the tire.

17. The component of claim 14, wherein the controller is configured to:
determine information indicative of a match between the sequence of samples and variations of a sequence of reference values,
wherein the sequence of reference values comprises at least one outlier value;
wherein the variations of the sequence of reference values comprise variations of different locations of the outlier value within the sequence; and
determine the position of the at least one reference sample in the sequence of samples based on the match.

18. The component of claim 14, wherein the controller is further configured to:
obtain another sequence of samples indicative of at least the radial acceleration component during at least another rotation of the tire, and
determine another position of another at least one reference sample in the other sequence, wherein the position of the other at least one reference sample is indicative of the time information of the contact patch event of the rolling tire.

19. An apparatus comprising:
a tire;
a tire-mounted sensor, the sensor configured to measure at least a radial acceleration component of the tire; and
a controller coupled to the sensor, the controller being configured to:
obtain information indicative of a rotational rate of the tire;
obtain a sequence of samples indicative of at least an acceleration component during at least one rotation of the tire;
determine a position of at least one reference sample in the sequence, wherein the position of the at least one reference sample is indicative of a time information of the contact patch event of the rolling tire; and
a transmitter, coupled to the controller, the transmitter being configured to transmit the time information of the contact patch event of the rolling tire.

20. A non-transitory machine readable storage including machine readable instructions to determine a time information of at least one contact patch event of a rolling tire, that when executed:
obtain information indicative of a rotational rate of the tire;
obtain a sequence of samples indicative of at least an acceleration component during at least one rotation of the tire; and
determine a position of at least one reference sample in the sequence, wherein the position of the at least one reference sample is indicative of the time information of the contact patch event of the rolling tire.

* * * * *